US012012246B2

(12) United States Patent
Totani

(10) Patent No.: US 12,012,246 B2
(45) Date of Patent: Jun. 18, 2024

(54) PUNCHING MACHINE AND SPOUT ATTACHING DEVICE

(71) Applicant: Totani Corporation, Kyoto (JP)

(72) Inventor: Mikio Totani, Kyoto (JP)

(73) Assignee: Totani Corporation, Kyoto (JP)

( * ) Notice: Subject to any disclaimer, the term of this patent is extended or adjusted under 35 U.S.C. 154(b) by 10 days.

(21) Appl. No.: 17/793,650

(22) PCT Filed: Dec. 1, 2020

(86) PCT No.: PCT/JP2020/044657
§ 371 (c)(1),
(2) Date: Jul. 19, 2022

(87) PCT Pub. No.: WO2021/166362
PCT Pub. Date: Aug. 26, 2021

(65) Prior Publication Data

US 2023/0089787 A1 Mar. 23, 2023

(30) Foreign Application Priority Data

Feb. 21, 2020 (JP) ................................ 2020-028693

(51) Int. Cl.
*B65B 61/18* (2006.01)
*B31B 70/14* (2017.01)
*B31B 70/84* (2017.01)

(52) U.S. Cl.
CPC ............ *B65B 61/186* (2013.01); *B31B 70/14* (2017.08); *B31B 70/142* (2017.08); *B31B 70/844* (2017.08)

(58) Field of Classification Search
CPC .... B31B 70/844; B31B 70/142; B65B 61/186
USPC ......................... 53/133.2; 493/927, 929, 213
See application file for complete search history.

(56) References Cited

U.S. PATENT DOCUMENTS

| | | | | |
|---|---|---|---|---|
| 1,451,610 | A * | 4/1923 | Gestas | B26F 1/02 408/112 |
| 3,244,576 | A | 4/1966 | Swartz | |
| 3,355,340 | A * | 11/1967 | Calvert | B29C 66/83221 156/120 |
| 3,389,643 | A * | 6/1968 | Lemcke | B29C 65/18 493/203 |
| 3,434,908 | A | 3/1969 | Macdonald | |
| 4,160,396 | A * | 7/1979 | Matzner | B26F 1/14 83/100 |
| 4,566,250 | A * | 1/1986 | Matsumura | B29C 66/8322 53/64 |
| 4,695,337 | A * | 9/1987 | Christine | B29C 66/81429 493/203 |

(Continued)

FOREIGN PATENT DOCUMENTS

| | | |
|---|---|---|
| CN | 208826780 | 5/2019 |
| JP | 5913695 | 4/2016 |

*Primary Examiner* — Joshua G Kotis
(74) *Attorney, Agent, or Firm* — JCIPRNET

(57) ABSTRACT

A punching machine includes a punch blade and a support for supporting a spout. The punching machine further includes a drive mechanism. When the punch blade and the spout supported by the support face each other in a direction perpendicular to a web with the web interposed between the punch blade and the spout, the drive mechanism moves one of the punch blade or the support towards the other in the vertical direction to punch a hole in the web using the punch blade and the spout.

15 Claims, 16 Drawing Sheets

(56) References Cited

U.S. PATENT DOCUMENTS

| | | | | | |
|---|---|---|---|---|---|
| 4,767,478 | A * | 8/1988 | Christine | B29C 66/81429 | 156/253 |
| 5,114,394 | A * | 5/1992 | Madsen | B26D 9/00 | 83/639.1 |
| 6,148,710 | A * | 11/2000 | Pottorff | B26F 3/002 | 83/682 |
| 9,266,635 | B2 * | 2/2016 | Ickert | B65B 7/164 | |
| 9,417,589 | B2 * | 8/2016 | Kubota | B26F 1/0092 | |
| 9,931,758 | B2 * | 4/2018 | Ohnishi | B26F 1/02 | |
| 11,072,476 | B2 * | 7/2021 | Totani | B29C 66/83221 | |
| 2017/0008244 | A1 | 1/2017 | Totani | | |

* cited by examiner

PUNCHING MACHINE AND SPOUT ATTACHING DEVICE

CROSS-REFERENCE TO RELATED APPLICATION

This application is a 371 application of an international PCT application serial no. PCT/JP2020/044657, filed on Dec. 1, 2020, which claims the priority benefit of Japan application JP 2020-028693, filed on Feb. 21, 2020. The entirety of each of the above-mentioned patent applications is hereby incorporated by reference herein and made a part of this specification.

TECHNICAL FIELD

This application relates to a punching machine for punching a hole for a spout in a web while the web is paused in an intermittent feed cycle, and to a spout attaching device comprising the punching machine.

BACKGROUND

Bag making apparatuses for making bags each with a spout are well-known. For example, such a bag making apparatus includes a feed device for intermittently feeding a web, such as a continuous sheet panel, in the longitudinal direction of the web, and a spout attaching device for attaching spouts to the web.

The spout attaching device disclosed in Patent document 1 includes a punching machine and a seal device. The punching machine includes a punch blade and a punch receiving table, and punches a hole in the sheet panel using these.

Thereafter, the spout attaching device moves the punching machine away from the punching position and moves the seal device to that position. Then, the seal device carries a spout to the hole of the sheet panel and seals the spout to the sheet panel.

Such attachment of the spout is performed during the pause phase of the intermittent feed cycle. And the attachment of the spout is repeated every intermittent feed cycle.

There is a demand for improved bag-making efficiency. Thus, the devices of the bag making apparatus, such as the punching machine, have been improved.

An object of the present application is to provide a novel punching utilizing a spout.

CITATION LIST

Patent Document

Patent Document 1: JP5913695B1

SUMMARY

According to an aspect of the present application, there is provided a punching machine for punching a hole for a spout in a web while the web is paused in an intermittent feed cycle, the punching machine including a punch blade and a support for supporting a spout. The punching machine further includes a drive mechanism configured to move one of the punch blade or the support towards the other in a direction perpendicular to the web when the punch blade and the spout supported by the support face each other in the perpendicular direction with the web interposed therebetween, to punch a hole in the web using the punch blade and the spout.

The drive mechanism may be configured to move the punch blade towards the support to punch a hole in the web using the punch blade and the spout. The drive mechanism may be configured to move the support to bring the spout into contact with the web prior to punching.

The drive mechanism may be configured to move the support towards the punch blade to punch a hole in the web using the punch blade and the spout. The drive mechanism may be configured to bring the punch blade into contact with the web prior to punching.

The spout may include a cylindrical body having a first end and a second end, and a flange located on and around an outer circumference of the cylindrical body at the first end. The support may have a receiving section for receiving the cylindrical body such that the flange is directed to the web. The drive mechanism may be configured to move the support to bring the flange into contact with the web prior to punching.

The punching machine may further include a receiving table for the web. The receiving table may have a passage hole as a through hole which extends in the perpendicular direction to allow the punch blade to move in. The drive mechanism may be configured to move the support to press the spout against the web and the receiving table. Also, the drive mechanism may be configured to move the punch blade towards the support with the spout pressed against the web and the receiving table to punch a hole in the web using the punch blade and the spout.

The spout may include a cylindrical body having a first end and a second end, and a flange located on and around the outer circumference of the cylindrical body at the first end. The support may have a receiving section for receiving the flange such that the second end is directed to the web. The drive mechanism may be configured to move the support to bring the second end into contact with the web prior to punching.

The outer diameter of the punch blade may be smaller than or equal to an inner diameter of a cylindrical body of the spout. The inner diameter of the punch blade may be larger than or equal to the outer diameter of a cylindrical body of the spout.

The punching machine may further include an elastic member disposed around an outer circumference of the punch blade to protrude further than the tip of the punch blade, wherein the elastic member is pressed against the web to be compressed upon movement of the punch blade towards the web.

The drive mechanism may include a first drive unit configured to move the punch blade in the perpendicular direction, and a second drive unit configured to move the support in the perpendicular direction.

According to another aspect of the present application, there is provided a spout attaching device for attaching a spout to a web which is intermittently fed, the spout attaching device including the above-mentioned punching machine and a seal device configured to seal the spout to the web during a pause phase of an intermittent feed cycle.

The punching machine may be configured to position the spout with respect to the web such that the hole and the spout are aligned with each other. The seal device may be configured to seal the positioned spout to the web.

DETAILED DESCRIPTION

Figure 1:
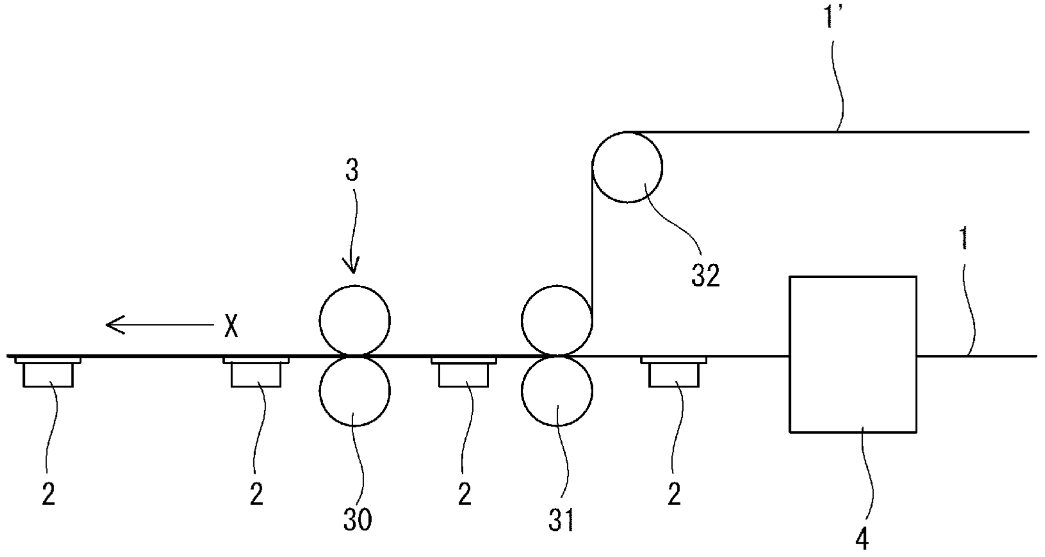
FIG. 1 is a partial and schematic side view of an example bag making apparatus.

The implementations according to the present application will now be described with reference to the accompanying drawings. Elements illustrated in the Figures are not drawn to scale, but only to illustrate operation. In each of the implementations, same or similar elements are indicated by same reference numerals.

FIG. 1 partially and schematically illustrates an example bag making apparatus. The bag making apparatus makes bags each with a spout 2 from at least a web 1 and the spouts 2. The web 1 is, for example, a continuous sheet panel and a plastic film. The web 1 is not limited to a sheet panel for forming the panel parts of the bags, but may be, for example, a continuous end face web for forming the end face parts (top face parts or bottom face parts) of the bags. Alternative to the plastic film, the web 1 may also be, for example, paper or a laminate consisting of a base made of paper and a film laminated to the base.

The bag making apparatus includes a feed device 3 configured to intermittently feed the web 1 in the longitudinal direction of the web 1. That is, the web 1 is repeatedly fed and paused by the feed device 3. The bag making apparatus further includes a spout attaching device 4 configured to attach the spouts 2 to the web 1.

The feed device 3 in the implementation includes drive rollers 30 and guide rollers 31 and 32. The web 1 and an additional web 1' are sandwiched between the drive rollers 30 in a state in which they are superposed on each other. The drive rollers 30 are intermittently rotated by a motor (not shown), so that the webs 1 and 1' are intermittently fed in their longitudinal direction. The direction X designates the direction in which the webs 1 and 1' are fed. The guide rollers 31 and 32 are disposed upstream of the drive rollers 30. The web 1 is guided by the guide roller 31, and the web 1' is guided by the guide rollers 31 and 32, so that the webs 1 and 1' are superposed on each other by the guide rollers 31. In the implementation, the bags are successively made from at least the webs 1 and 1' and the spouts 2.

The drive rollers 30 and the guide rollers 31 and 32 that are located downstream of the position where the spouts 2 are to be attached, each have a configuration such as a well-known roller with a groove which allows for feeding the webs 1 and 1' without interfering with the spouts 2.

Figure 2A:
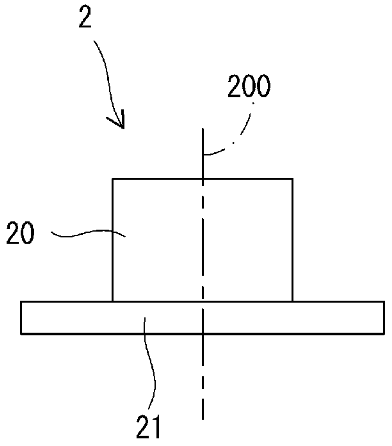
FIG. 2A is a side view of an example spout.
Figure 2B:
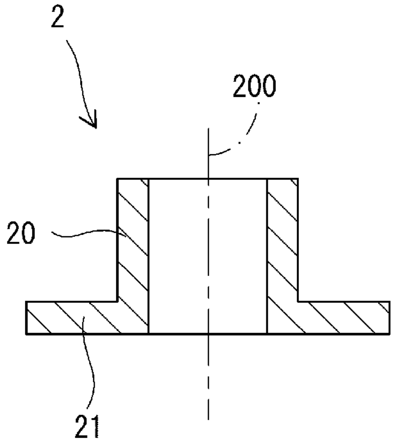
FIG. 2B is a cross-sectional view of the spout.

An example spout 2 is illustrated in FIGS. 2A and 2B. The spout 2 has a cylindrical body 20 and an annular flange 21. The body 20 has a first end and a second end as its opposite ends. The flange 21 is located on and around the outer circumference of the body 20 at the first end of the body 20. The numeral 200 designates the axis of the body 20.

Figure 3:
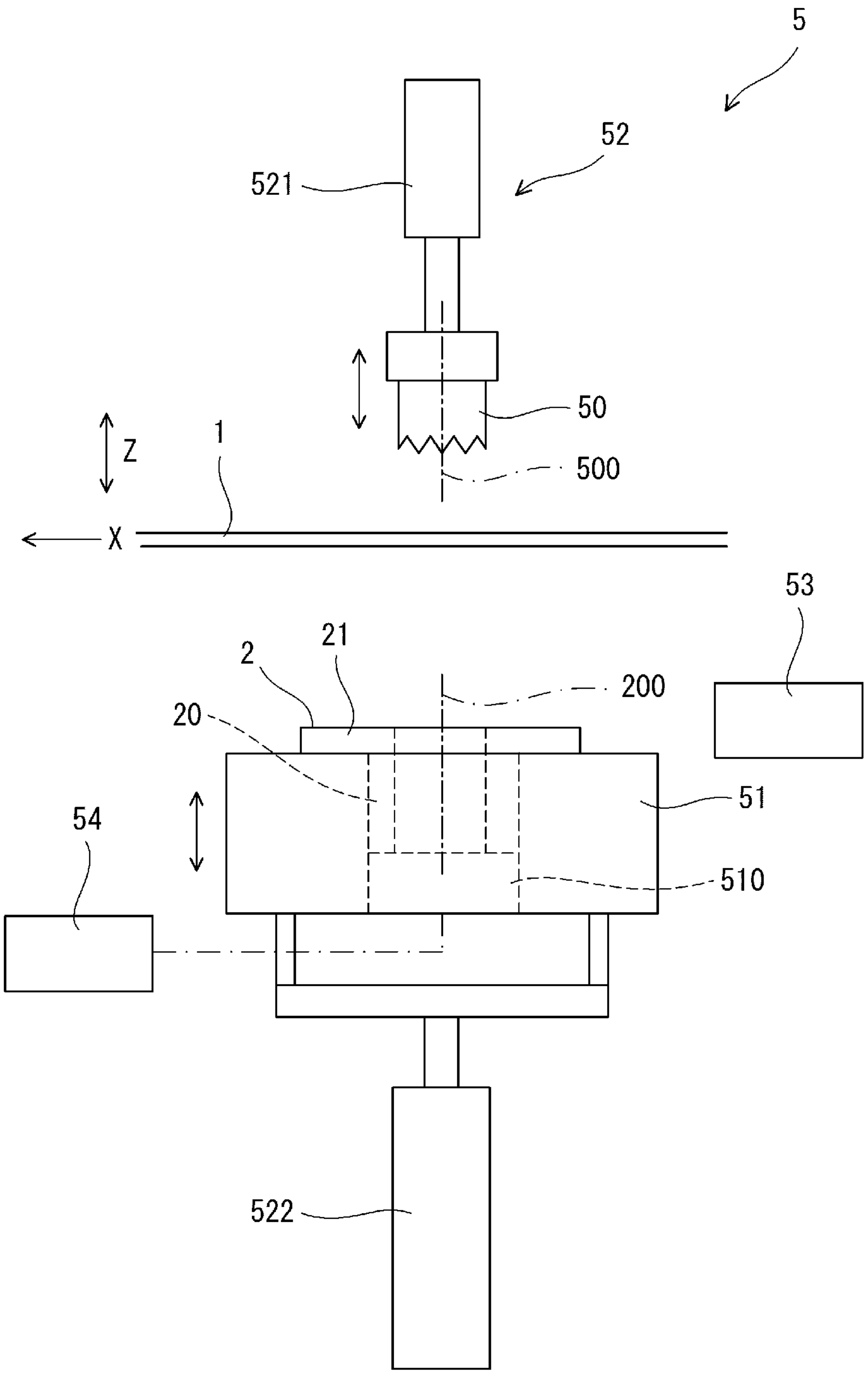
FIG. 3 schematically illustrates an example punching machine.

As illustrated in FIG. 3, the spout attaching device 4 includes a punching machine 5 configured to punch a hole 10 (FIG. 6A, etc.) for the spout 2 in the web 1 while the web 1 is paused in an intermittent feed cycle.

The punching machine 5 includes a punch blade 50 and a support 51 for supporting the spout 2. The punching machine 5 further includes a drive mechanism 52 configured to move the punch blade 50 and the support 51 to punch a hole 10 in the web 1 as described below. The punching machine 5 further includes a spout feeder 53 configured to supply the spouts 2 to the support 51, and a suction machine 54 for suctioning wastes 11 (FIG. 5B) generated during punching.

In the implementation, the punch blade 50 has the outer diameter that is smaller than or equal to the inner diameter of the body 20 of the spout 2. Specifically, the punch blade 50 is a serrated blade having the outer diameter that is slightly smaller than the inner diameter of the body 20. The numeral 500 designates the axis of the punch blade 50.

The support 51 has a receiving section 510 for receiving the spout 2. The receiving section 510 in the implementation is formed in the block-shaped support 51 as a through hole for receiving the body 20.

The drive mechanism 52 in the implementation includes a first drive unit 521 configured to move the punch blade 50 in the direction Z perpendicular to the web 1, and a second drive unit 522 configured to move the support 51 in the direction Z. In the implementations where the web 1 is fed horizontally and intermittently, the direction Z is the vertical direction.

The punch blade 50 is attached to the first drive unit 521, located on one side (upper side) with respect to the web 1 that is being intermittently fed, and directed to the first surface (upper surface) of the web 1. The first drive unit 521 in the implementation moves the punch blade 50 in the direction Z between the position where the punch blade 50 is away from the web 1 (that is being fed horizontally and intermittently by the feed device 3) and the position where the punch blade 50 is through the web 1. For example, the first drive unit 521 may include an actuator (e.g., a cylinder) for linearly moving the punch blade 50.

The support 51 is attached to the second drive unit 522, located on the other side (lower side) with respect to the web 1 that is being intermittently fed, and directed to the second surface (lower surface) of the web 1. The punch blade 50 and the support 51 face each other in direction Z with the web 1 interposed therebetween. The second drive unit 522 in the implementation moves the support 51 in the direction Z between the position where the support 51 is away from the web 1 and the position where the spout 2 supported by the support 51 contacts with the web 1. For example, the second drive unit 522 may include an actuator (e.g., a cylinder) for linearly moving the support 51.

The spout feeder 53 supplies a spout 2 to the support 51 when the support 51 is away from the web 1. The spout feeder 53 in the implementation supplies the spout 2 such that the body 20 is received in the receiving section 510 and that the flange 21 is supported by the top surface of the support 51 to be directed to the web 1. When the spout 2 is supported by the support 51, the spout 2 and the punch blade 50 face each other in the direction Z with the web 1 interposed therebetween. Furthermore, the axis 200 of the spout 2 is aligned with the axis 500 of the punch blade 50. Although the details of the spout feeder 53 are omitted, it may be a robot, for example as in Patent document 1.

The suction machine 54 in the implementation is connected to the support 51 to suction a waste 11 (that will be generated during punching), through the receiving section 510 formed as a through hole. The suction machine 54 may include, for example, a tube connected to the support 51, a pump to generate negative pressure, etc.

The operation of the punching machine 5 will be described below. The drive mechanism 52 (the first and second drive units 521 and 522), the spout feeder 53, and the suction machine 54 are not shown in FIGS. 4A to 7B. The following punching is performed while the web 1 is paused in an intermittent feed cycle.

Figure 4A:
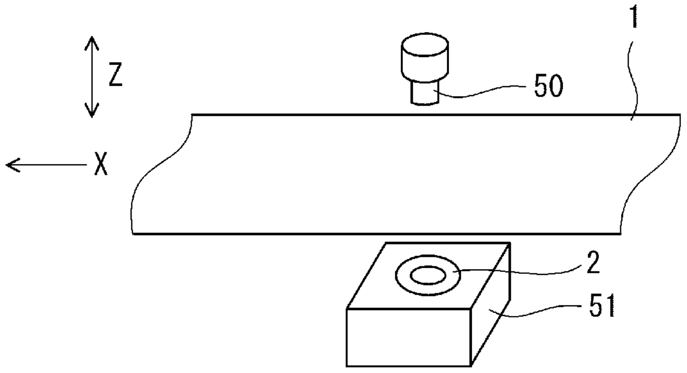
FIGS. 4A and 4B illustrate an example punching.

As illustrated in FIG. 4A, the punch blade 50 and the support 51 are kept away from the web 1 by the first and second units 521 and 522, respectively. When the support 51 is kept away from it, the spout feeder 53 supplies a spout 2 to the support 51 such that the spout 2 is supported by the support 51.

Figure 4B:
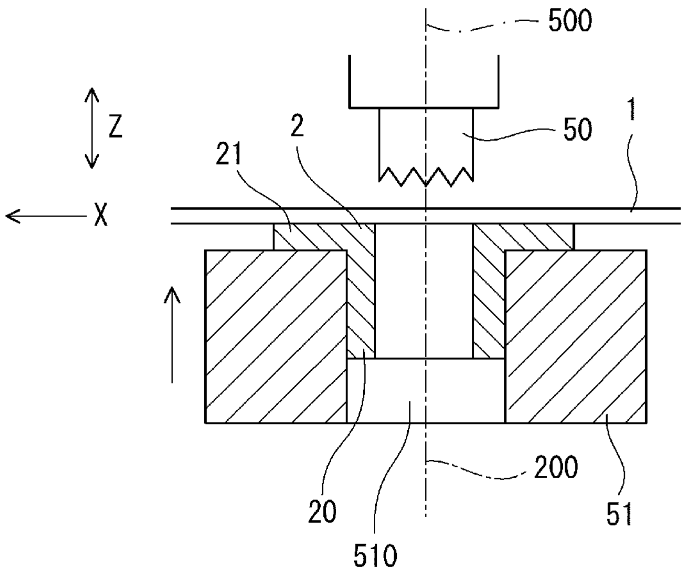

As illustrated in FIG. 4B, the second drive unit 522 moves the support 51 upward to bring the flange 21 into contact with the web 1, thereby positioning the spout 2 with respect to the web 1.

Figure 5A:
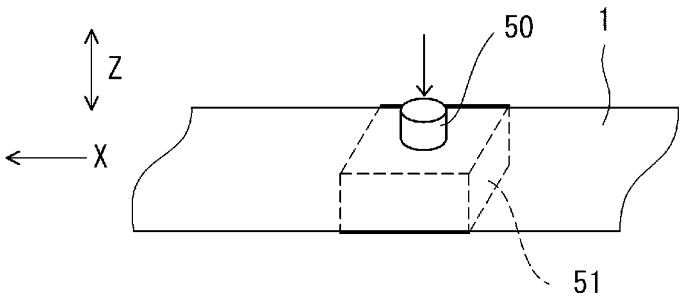
FIGS. 5A and 5B illustrate the example punching.
Figure 5B:
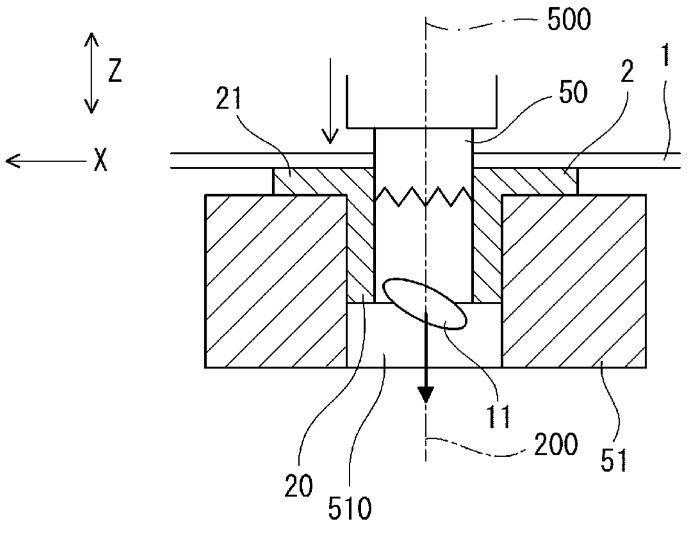

As illustrated in FIGS. 5A and 5B, the first drive unit 521 moves the punch blade 50 towards the support 51 to punch a hole 10 (FIG. 6A) in the web 1 using the punch blade 50 and the spout 2. In the implementation, it causes the web 1 to be sandwiched between the punch blade 50 and the spout 2, and then the punch blade 50 to penetrate through the web 1 and be inserted in the body 20, thereby creating a hole 10 in the web 1. The hole 10 is aligned with the positioned spout 2.

A waste 11 is generated during punching. The waste 11 is suctioned through the receiving portion 510 by the suction machine 54.

Figure 6A:
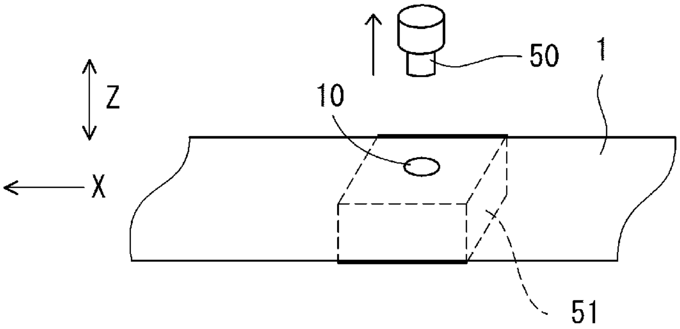
FIGS. 6A and 6B illustrate the example punching.
Figure 6B:
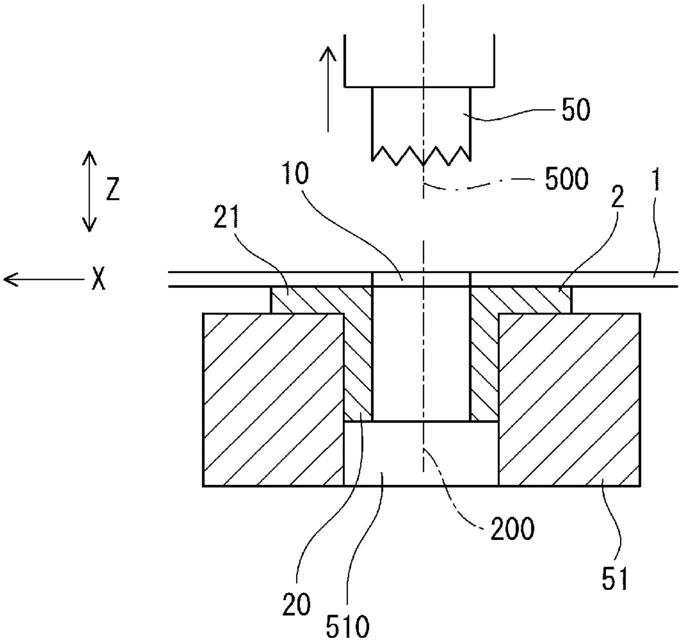

As illustrated in FIGS. 6A and 6B, after punching, the first drive unit 521 moves the punch blade 50 away from the web 1, whereas the second drive unit 522 does not move the support 51 away from the web 1, thereby remaining the spout 2 positioned with respect to the web 1 (hole 10).

As described above, the punching machine 5 punches a hole 10 in the web 1 by means of the cooperation of the spout 2 and the punch blade 50 while the web 1 is paused in an intermittent feed cycle. After the punching step, the spout attachment device 4 performs the step of sealing a spout 2 to the web 1.

Figure 7A:
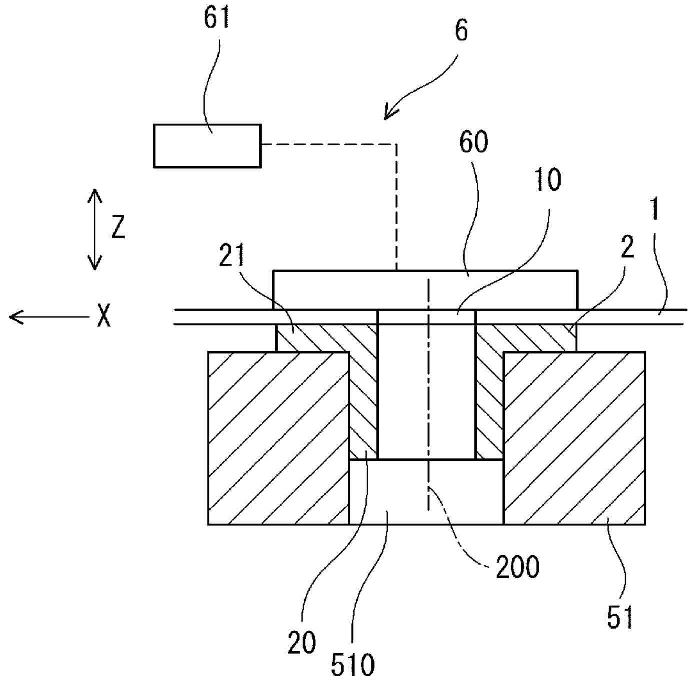
FIGS. 7A and 7B illustrate an example sealing.

For this, as illustrated in FIG. 7A, the spout attachment device 4 further includes a seal device 6 configured to seal the positioned spout 2 to the web 1 while the web 1 is paused in the intermittent feed cycle. The seal device 6 includes, for example, a seal head 60 for sealing the spouts 2 to the web 1 and a head drive mechanism 61 (including, for example, a drive arm) for moving the seal head 60.

The seal device 6 moves the seal head 60 to the predetermined position suitable for sealing, using the head drive mechanism 61, and seals the spout 2 (its flange 21) to the web 1 using the seal head 60. For example, a heated seal block is used as the seal head 60. As illustrated in FIG. 7A, the seal device 6 sandwiches the flange 21 and the web 1 between the seal block 60 and the support 51, thereby heat-sealing the web 1 and the flange 21 to each other. The seal device 6 then moves the seal head 60 away using the head drive mechanism 61.

Alternative to heat-sealing using the above seal block, sealing of spout 2 may also be in other forms, such as laser or ultrasonic sealing. Therefore, it is enough that the seal head 60 has a configuration suitable for the form of sealing.

Figure 7B:
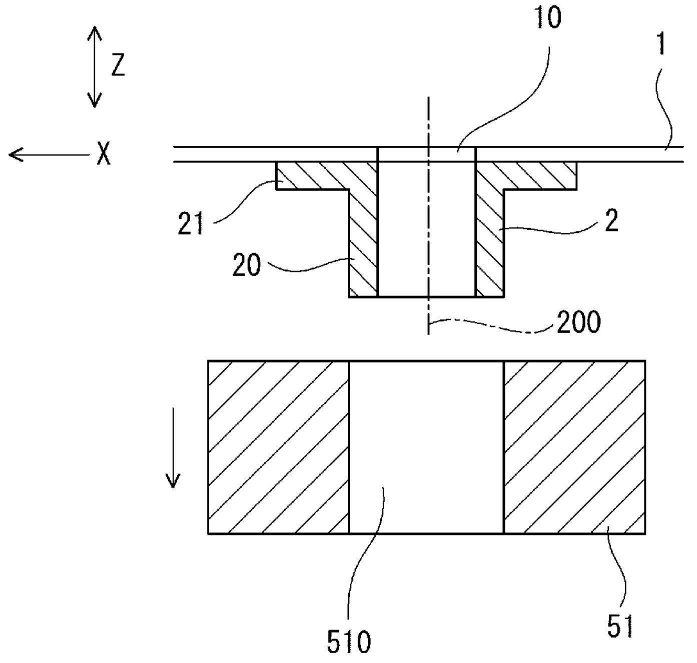

As illustrated in FIG. 7B, after sealing, the second drive unit 522 moves the support 51 downward away from the web 1. Since the spout 2 is sealed to web 1, only support 51 is moved away from the web 1.

As described above, the spout 2 is attached to the web 1 during the pause phase of the intermittent feed cycle. The web 1 then begins to be fed together with the spout 2. The above punching and sealing steps are performed every intermittent feed cycle. Therefore, the spouts 2 are successively attached to the web 1. The bag thus produced allows the contents to be put in and taken out through the spout 2 and the hole 10.

Punching in the other implementations will be described below.

Figure 8:
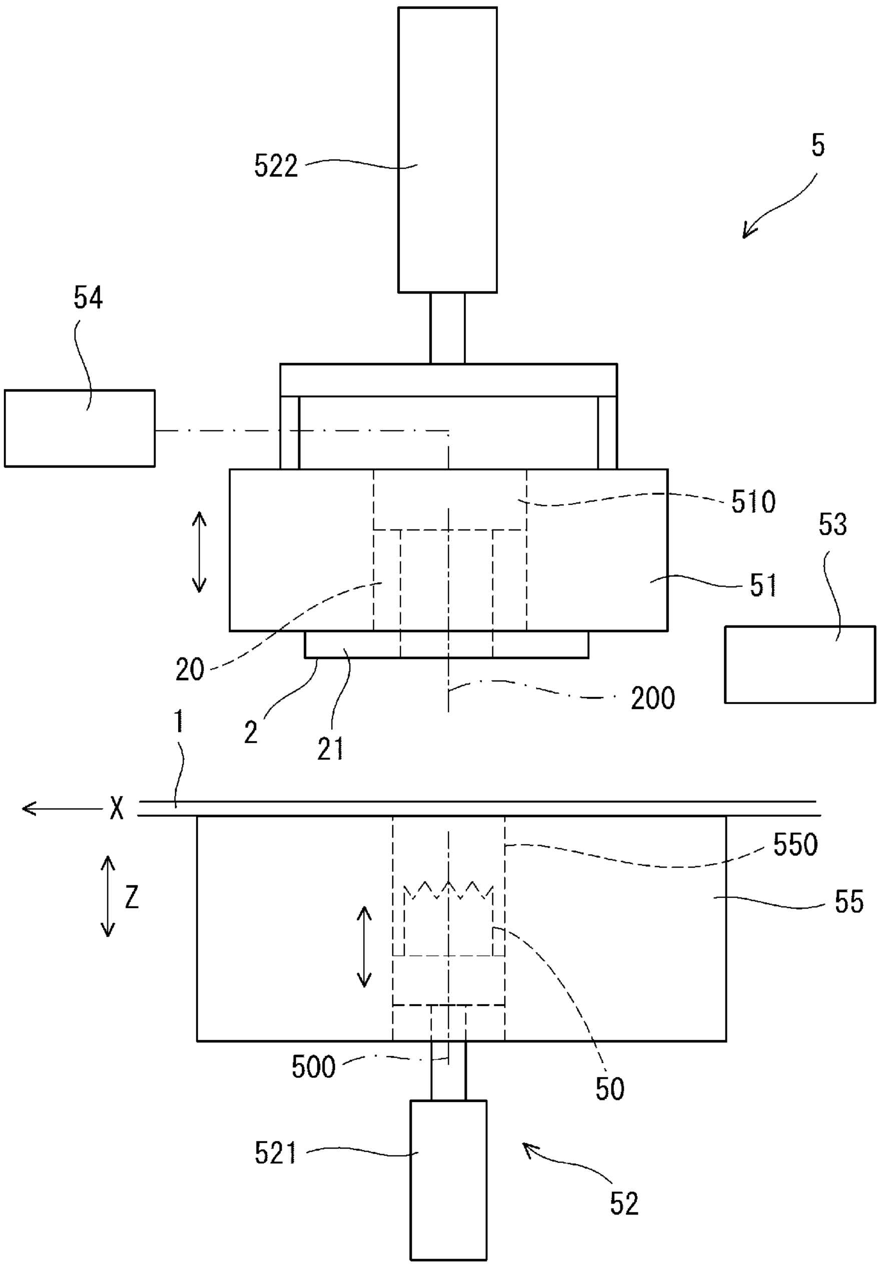
FIG. 8 schematically illustrates an example punching machine.

In the implementation of FIG. 8, the punch blade 50 is located below the web 1, and the support 51 is located above the web 1. Correspondingly, the respective components are arranged in position. The punching device 5 further includes a receiving table 55 for the web 1. The receiving table 55 has a passage hole 550 as a through hole that extends in the direction Z to allow the punch blade 50 to move through.

Figure 9A:
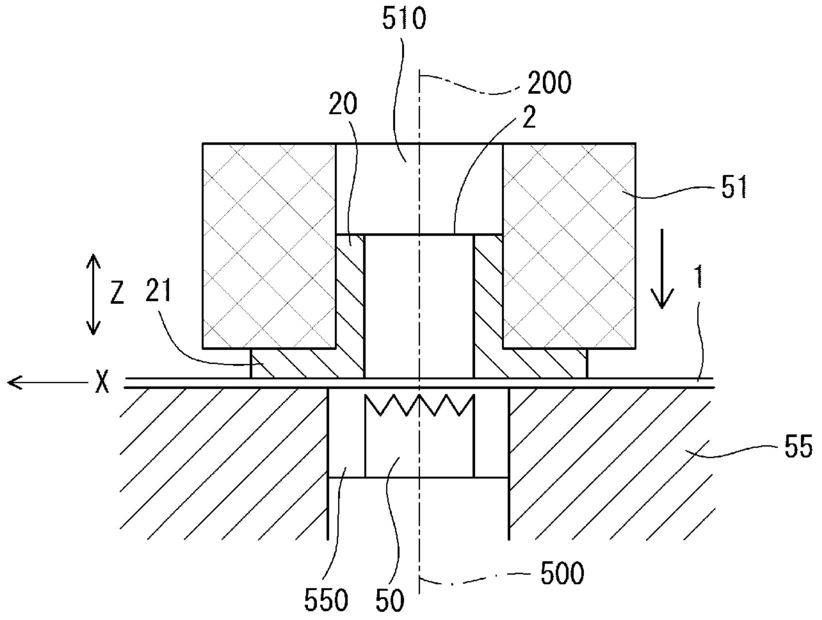
FIGS. 9A and 9B illustrate an example punching.

As illustrated in FIG. 9A, the second drive unit 522 moves the support 51 downward to bring the flange 21 into contact with the web 1 and to press the flange 21 against the web 1 and the receiving table 55 using the support 51. This causes the flange 21 and the web 1 to be sandwiched between the support 51 and the receiving table 55, and the flange 21 to be positioned with respect to the web 1.

Figure 9B:
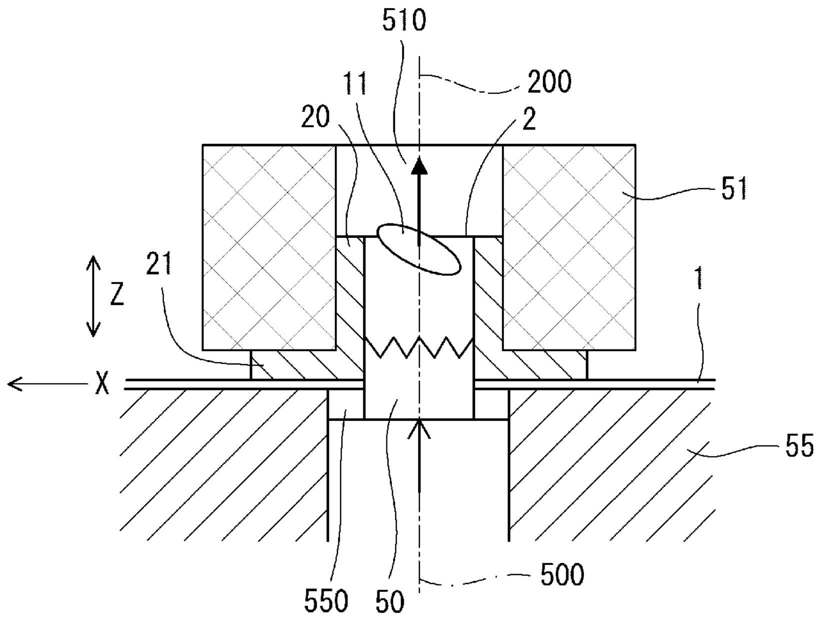

As illustrated in FIG. 9B, the first drive unit 521 moves the punch blade 50 upward towards the support 51 to punch a hole (FIG. 10) in the web 1 using the punch blade 50 and the spout 2. The waste 11 is suctioned through the receiving section 510 by the suction machine 54.

Figure 10:
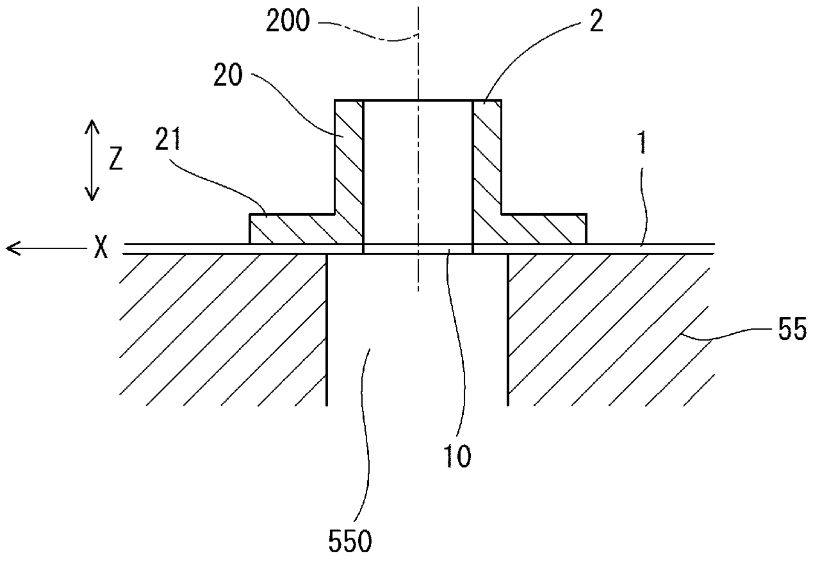
FIG. 10 illustrates the example punching.

As illustrated in FIG. 10, the first drive unit 521 moves the punch blade 50 downward away. The second drive unit 522 moves the support 51 upward away, leaving the spout 2 on the web 1.

The seal device (not shown in this implementation) includes a ring-shaped heater built in the receiving table 55. During the punching step, the material of the surface of the web 1 in contact with the flange 21 is heated by the heater to a temperature above its melting point, which causes the spout 2 to be heat-sealed to the web 1. Thus, the punching step and the sealing step are performed simultaneously in this implementation.

A spout 2 is attached to the web 1 in this way. The above attachment of the spout 2 is performed during the pause phase of the intermittent feed cycle. And this is repeated every intermittent feed cycle.

Figure 11:
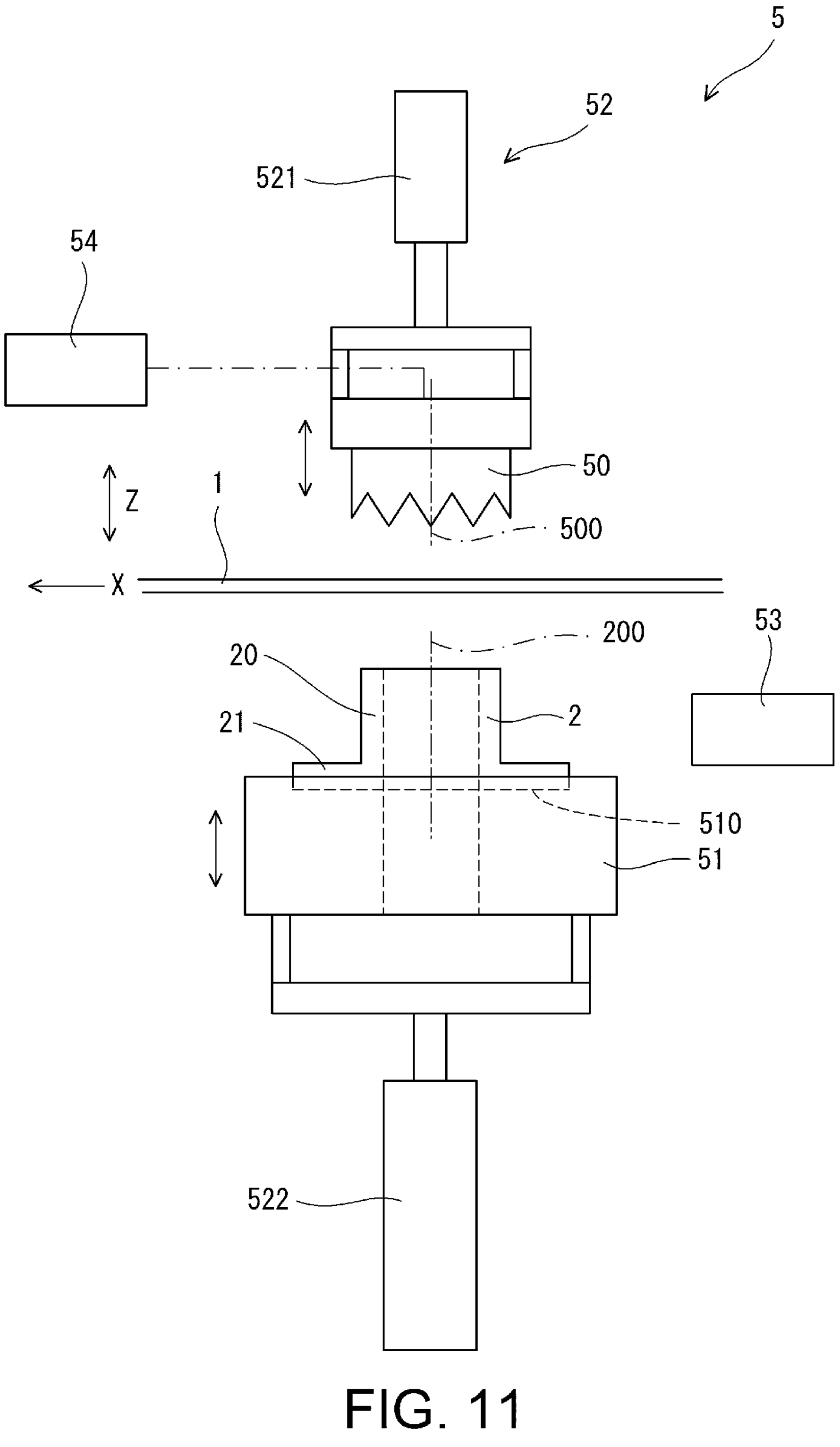
FIG. 11 schematically illustrates an example punching machine.

In the implementation of FIG. 11, the punch blade 50 is located above the web 1, and the support 51 is located below the web 1. Correspondingly, the respective components are arranged in position. The inner diameter of the punch blade 50 is larger than or equal to the outer diameter of the body 20. Specifically, the punch blade 50 is a serrated blade and has the inner diameter that is slightly larger than the outer diameter of the body 20. The receiving section 510 is formed in the support 51 as a recess for receiving the flange 21. The spout feeder 53 supplies the spout 2 to the support 51 such that the flange 21 is received in the receiving section 510 and that the second end (the end opposite to the flange 21) of the body 20 is directed to the web 1. The suction machine 54 is connected not to the support 51 but to the punch blade 50 to suction the waste(s) 11 (FIG. 12B) through the punch blade 50.

Figure 12A:
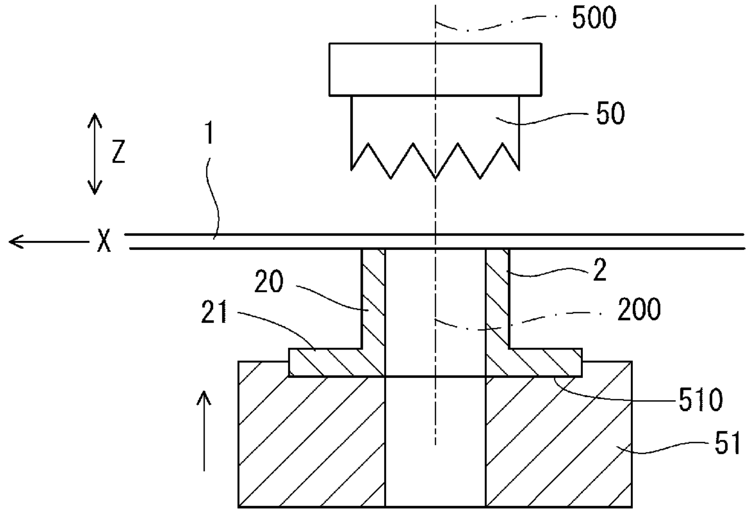
FIGS. 12A and 12B illustrate an example punching.

As illustrated in FIG. 12A, after the supply of the spout 2 to the support 51, the second drive unit 522 moves the support 51 upward to bring the second end of the body 20 into contact with the web 1.

Figure 12B:
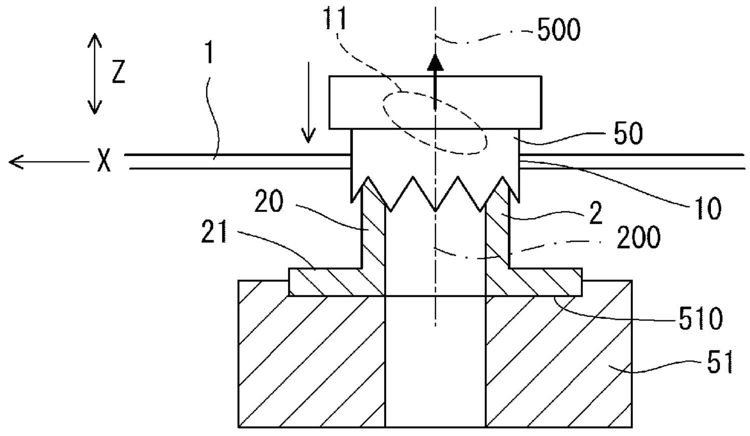

As illustrated in FIG. 12B, the first drive unit 521 moves the punch blade 50 downward toward the support 51 to punch a hole 10 in the web 1 using the punch blade 50 and the spout 2. In the implementation, it causes the web 1 to be sandwiched between the punch blade 50 and the spout 2, and then the punch blade 50 to penetrate through the web 1 and slide outside and along the spout 2 (body 20), thereby creating a hole 10 in the web 1. The hole 10 is aligned with the spout 2. The waste 11 is suctioned through the punch blade 50 by the suction machine 54.

Figure 13A:
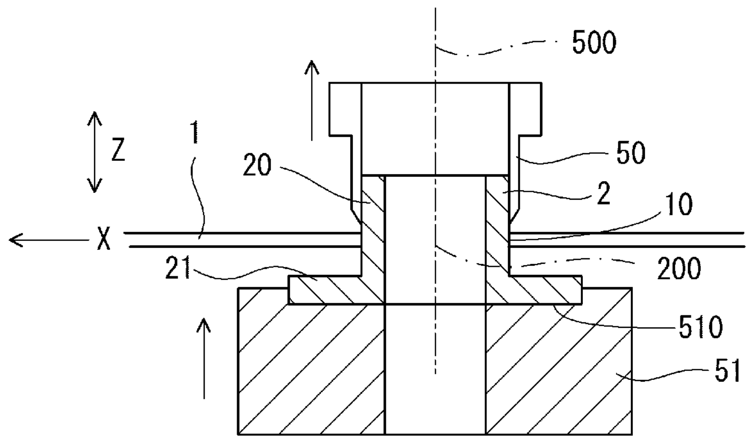
FIGS. 13A and 13B illustrate the example punching.
Figure 13B:
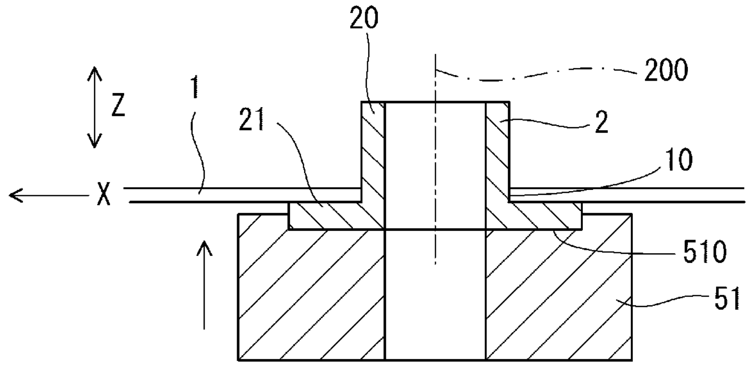

As illustrated in FIGS. 13A and 13B, the first drive unit 521 moves the punch blade 50 upward away from the web 1, while the second drive unit 522 moves the support 51 further upward to insert the body 20 into the hole 10 until the flange 21 comes into contact with the web 1. This causes the spout 2 to be positioned with respect to the web 1 for sealing.

Thereafter, the seal device (not shown in this implementation) seals the positioned spout 2 to the web 1. In this way, the spout 2 is attached to web 1. The above attachment of the spout 2 is performed during the pause phase of the intermittent feed cycle. And this is repeated every intermittent feed cycle.

Figure 14:
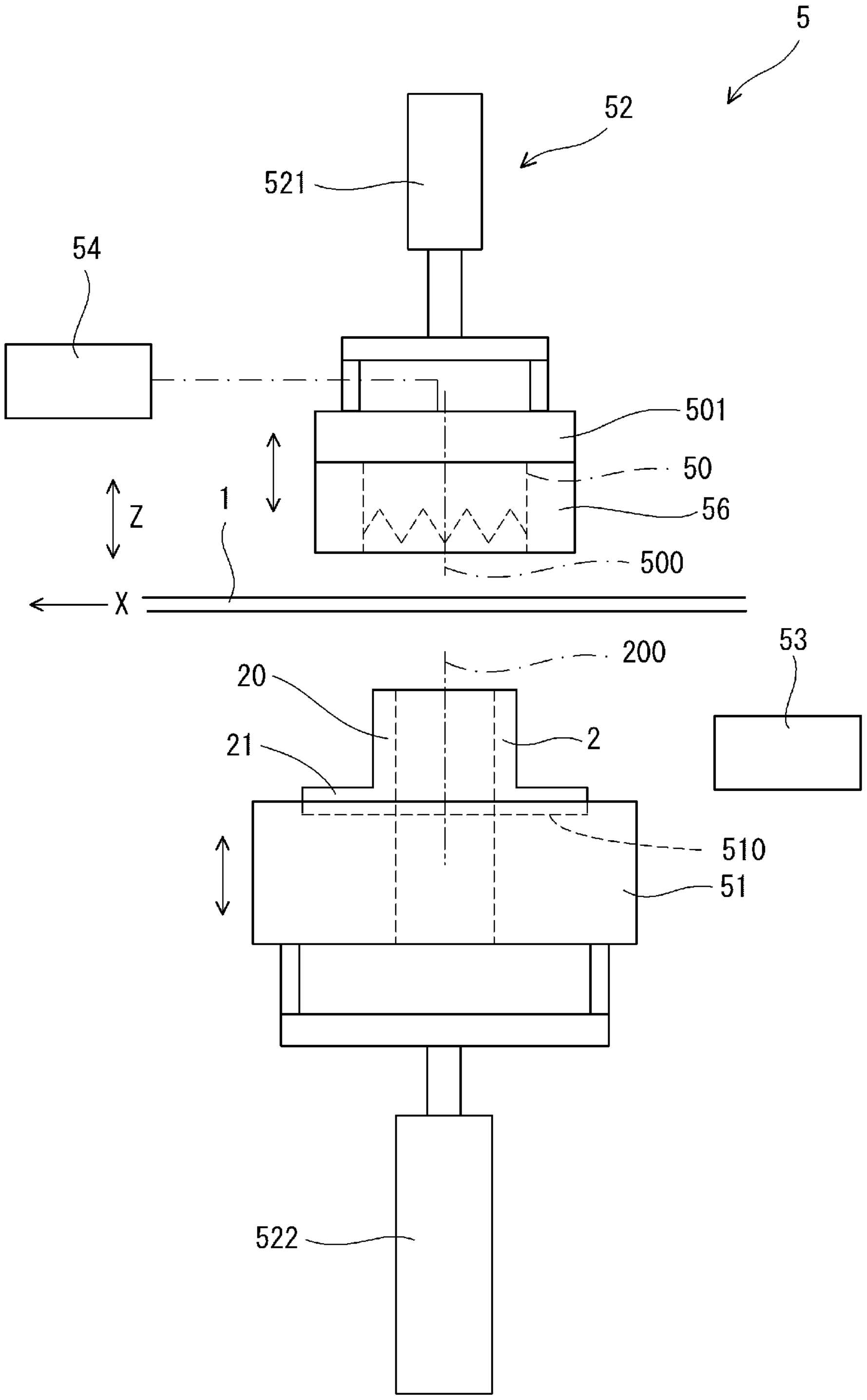
FIG. 14 schematically illustrates an example punching machine.

In the implementation of FIG. 14, the punching machine 5 further includes an annular elastic member 56 disposed around the outer circumference of the punch blade 50. The elastic member 56 is attached to the base 501 of the punch blade 50 to protrude further than the tip of the punch blade 50. The elastic member 56 has a first length L1 (FIG. 15A) when in the uncompressed state. The other components have the same configurations as in the previous implementations.

Figure 15A:
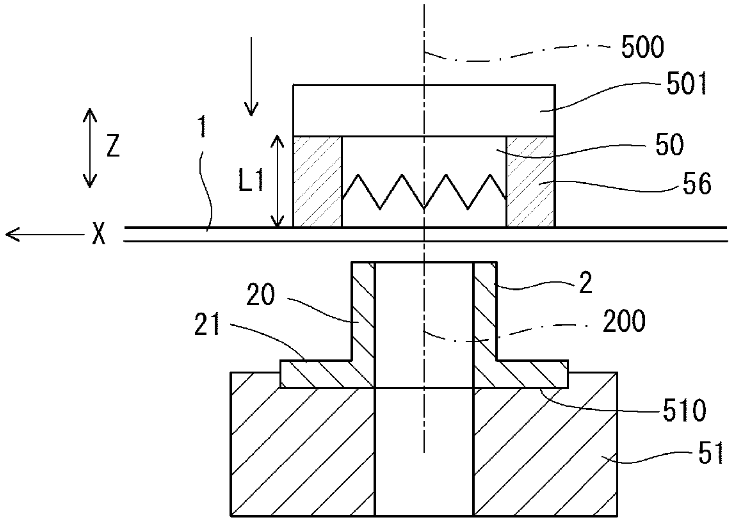
FIGS. 15A and 15B illustrate an example punching.
Figure 15B:
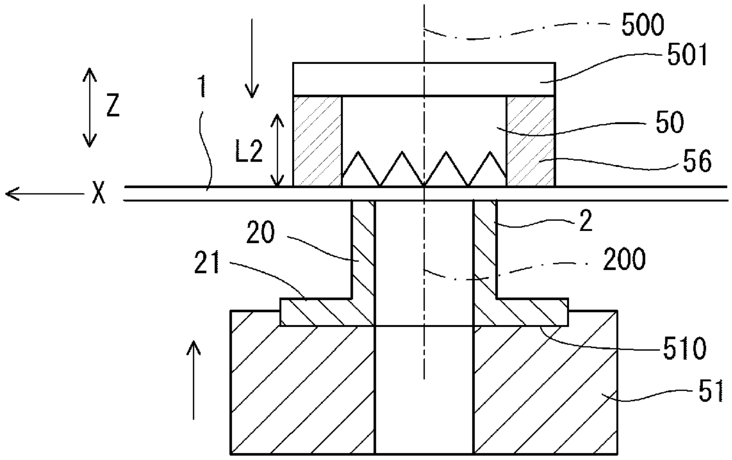

As illustrated in FIGS. 15A and 15B, the first drive unit 521 moves the punch blade 50 downward together with the elastic member 56 to bring the elastic member 56 into contact with the web 1, and further moves the punch blade 50 downward towards the web 1 to press and compress the elastic member 56 against the web 1, bringing also the punch blade 50 into contact with the web 1. Here, the compressed elastic member 56 has a second length L2 that is shorter than the first length L1.

Figure 16A:
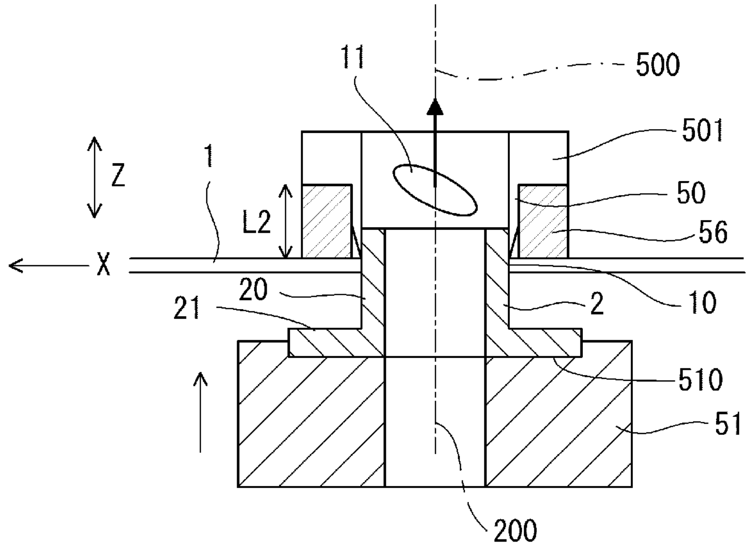
FIGS. 16A and 16B illustrate the example punching.

As illustrated in FIGS. 15B and 16A, when the elastic member 56 is pressed and compressed against the web 1 in this way, the second drive unit 522 moves the support 51 upward towards the punch blade 50 to punch a hole 10 in the web 1 using the punch blade 50 and the spout 2. That is, it causes the web 1 to be sandwiched between the punch blade 50 and the spout 2, and then the spout 2 (body 20) to penetrate through the web 1 and be inserted in the punch blade 50, thereby creating a hole 10 in the web 1. Therefore, it inserts the spout 2 (body 20) through the hole 10 at the same time of punching. The waste 11 is suctioned through the punch blade 50 by the suction machine 54.

Figure 16B:
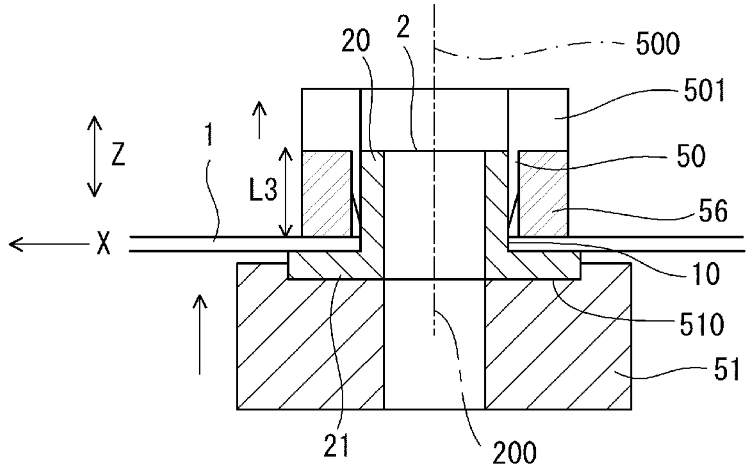

As illustrated in FIG. 16B, the second drive unit 522 further moves the support 51 upward to further insert the body 20 in the hole 10 until the flange 21 comes into contact with the web 1, while the first drive unit 521 also moves the punch blade 50 upward. Here, the elastic member 56 which still remains compressed, has a third length L3 that is shorter than the first length L1 and longer than the second length L2 (L2<L3<L1). That is, the web 1 is pressed against the flange 21 by the elastic member 56 until it comes into close contact with the flange 21, and the tip of the edge section of the punch blade 50 is not touching the web 1, thereby preventing the flange 21 from being damaged by the punch blade 50.

Figure 17:
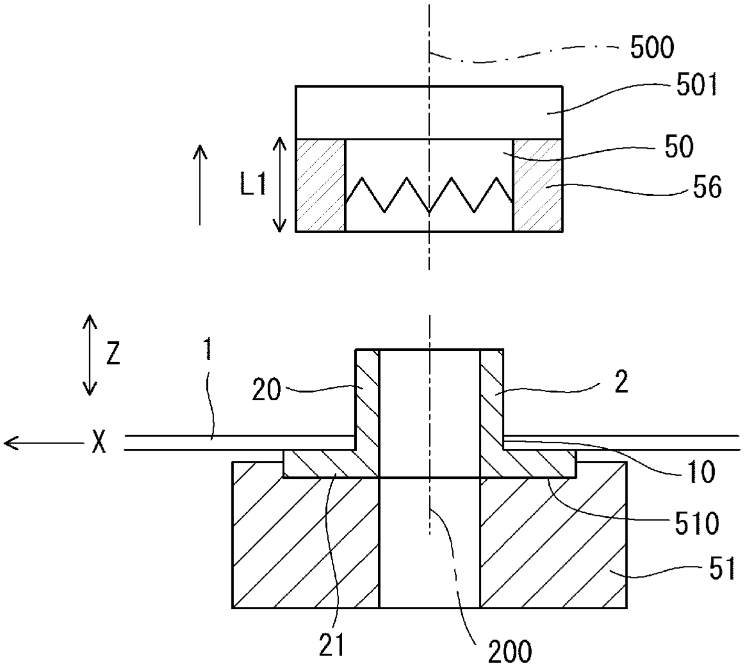
FIG. 17 illustrates the example punching.

As illustrated in FIG. 17, the first drive unit 521 then moves the punch blade 50 further upward to separate it completely from the spout 2.

Thereafter, the spout 2 that has been positioned as illustrated in FIG. 17, is sealed to the web 1 by a seal device as in the other implementations. In this way, a spout 2 is attached to the web 1. The above attachment of the spout 2 is performed during the pause phase of the intermittent feed cycle. And this is repeated every intermittent feed cycle.

As in the above respective implementations, the drive mechanism 52 moves one of the punch blades 50 or the support 51 in the direction Z towards the other when the punch blade 50 and the spout 2 supported by the support 51 face each other in the direction Z with the web 1 interposed therebetween, to punch a hole 10 in the web 1. That is, the respective implementations provide novel punching in which the spout 2 and the punch blade 50 cooperate together.

Patent document 1 requires moving the punch blade and the punch receiving table away after punching by means of these, and then carrying the spout to the web for sealing. Thus, it needs configurations for doing so. On the other hand, the implementations have the advantage that, upon punching, the spout 2 has already been carried to the web 1 and in addition aligned with the hole 10. This can lead to smooth operation of the sealing step, and improve the efficiency of attaching the spouts 2 and thus the efficiency of making bags. This also can contribute to the reduction in size of the punching machine 5, and thus the spout attachment device 4 and the bag making apparatus.

Properly selecting the type of punch blade 50 (e.g., selecting a serrated blade like the one in the implementations) allows the appropriate punching even when there is some clearance between the outer/inner surface of the punch blade 50 and the inner/outer surface of the spout 2 during punching. The vertical relationship between the punch blade 50 and the spout 2 and whether to punch inside or outside of the body 20 of the spout 2, can be arbitrarily selected.

The above respective implementations are merely examples in which the punching machine according to the present application is applied to the manufacture of very simple bags formed from the webs 1 and/or F. The punching machine according to the present application is not limited to the above respective implementations. The punching machines according to the present application may be applied in order to attach spouts to various types of bags, such as a square bottom bag with at least one gusset, a stand-up pack(bag).

The invention claimed is:

1. A punching machine for punching a hole for a spout in a web while the web is paused in an intermittent feed cycle, the punching machine comprising:

a punch blade, having a hollow cylindrical shape including an inner circumferential surface and an outer circumferential surface;

a support for supporting a spout; and a drive mechanism configured to move one of the punch blade or the support towards the other in a direction perpendicular to the web when the punch blade and the spout supported by the support face each other in the perpendicular direction with the web interposed therebetween, to punch the hole in the web using the punch blade and the spout, wherein the drive mechanism comprises a drive unit having an actuator, the drive unit being configured to move the punch blade towards the support in the perpendicular direction or move the support towards the punch blade in the perpendicular direction, to punch the hole in the web;

wherein the punching machine further comprises:

a suction machine for suctioning a waste generated during punching using the punch blade and the spout, wherein the spout comprises:

a cylindrical body having a first end and a second end; and a flange located on and around an outer circumference of the cylindrical body at the first end, wherein the support has a through hole for receiving the cylindrical body, and wherein the suction machine is connected to the support to suction the waste through an inside of the received cylindrical body and the through hole.

2. The punching machine of claim 1, wherein the drive mechanism is configured to move the punch blade towards the support to punch the hole in the web using the punch blade and the spout.

3. The punching machine of claim 2, wherein the drive mechanism is configured to move the support to bring the spout into contact with the web prior to punching.

4. The punching machine of claim 1, wherein the drive mechanism is configured to move the support towards the punch blade to punch the hole in the web using the punch blade and the spout.

5. The punching machine of claim 4, wherein the drive mechanism is further configured to bring the punch blade into contact with the web prior to punching.

6. The punching machine of claim 1, wherein the flange is directed to the web, and wherein the drive mechanism is configured to move the support to bring the flange into contact with the web prior to punching.

7. The punching machine of claim 6, further comprising a receiving table for the web, the receiving table having a passage hole as a through hole which extends in the perpendicular direction to allow the punch blade to move in, wherein the drive mechanism is configured to:

move the support to press the spout against the web and the receiving table; and move the punch blade towards the support with the spout pressed against the web and the receiving table to punch the hole in the web using the punch blade and the spout.

8. The punching machine of claim 1, wherein the second end is directed to the web, and wherein the drive mechanism is configured to move the support to bring the second end into contact with the web prior to punching.

9. The punching machine of claim 1, wherein an outer diameter of the punch blade is smaller than or equal to an inner diameter of the cylindrical body of the spout.

10. The punching machine of claim 1, wherein an inner diameter of the punch blade is larger than or equal to an outer diameter of the cylindrical body of the spout.

11. The punching machine of claim 10, further comprising an elastic member disposed around an outer circumference of the punch blade to protrude further than a tip of the punch blade, wherein the elastic member is pressed against the web to be compressed upon movement of the punch blade towards the web.

12. The punching machine of claim 1, wherein the drive unit comprises:

a first drive unit configured to move the punch blade in the perpendicular direction; and a second drive unit configured to move the support in the perpendicular direction.

13. A spout attaching device for attaching a spout to a web which is intermittently fed, the spout attaching device comprising:

the punching machine of claim 1; and a seal device configured to seal the spout to the web during a pause phase of an intermittent feed cycle.

14. The spout attaching device of claim 13, wherein the punching machine is configured to position the spout with respect to the web such that the hole and the spout are aligned with each other, and wherein the seal device is configured to seal the positioned spout to the web.

15. A punching machine for punching a hole for a spout in a web while the web is paused in an intermittent feed cycle, the punching machine comprising:

a punch blade, having a hollow cylindrical shape including an inner circumferential surface and an outer circumferential surface;

a support for supporting a spout; and a drive mechanism configured to move one of the punch blade or the support towards the other in a direction perpendicular to the web when the punch blade and the spout supported by the support face each other in the perpendicular direction with the web interposed therebetween, to punch the hole in the web using the punch blade and the spout, wherein the drive mechanism comprises a drive unit having an actuator, the drive unit being configured to move the punch blade towards the support in the perpendicular direction or move the support towards the punch blade in the perpendicular direction, to punch the hole in the web;

wherein the punching machine further comprises:

a suction machine for suctioning a waste generated during punching using the punch blade and the spout, wherein the suction machine is connected to the punch blade to suction the waste through an inside of the punch blade.

* * * * *